Patented Oct. 6, 1931                                                         1,825,798

UNITED STATES PATENT OFFICE

SHINJIRO HORII, OF KANDA-KU, TOKYO, JAPAN

STENCIL SHEET

No Drawing.        Application filed September 6, 1930.   Serial No. 480,193.

This invention relates to improvements in stencil sheets of the type commonly used for autographic and typewriting duplication, consisting of a sheet of fibrous material coated with a coating material which is impermeable to ink, and being adapted to be stencilized by the pressure of a writing stylus or by the impact of the type of a writing machine.

It has previously been proposed to provide a stencil sheet of this kind of a base of fibrous material, such as Japanese Yoshino paper, coated with a composition including a cellulose ester, such as cellulose acetate or nitrate, dissolved in a volatile solvent, such as amyl acetate, in admixture with a tempering agent such as oils or fatty material, such as castor oil, soya bean oil, mineral oil, oleine, stearine, tallow and paraffine residues.

It has also been proposed to provide such a stencil sheet of a fibrous base coated with a material including esters of polysaccharides and a tempering agent, such as naphthenic acid glycerides, chlorinated naphthalene, naphthenic acid and fatty acid of tsubaki oil.

The stencil sheet according to the present invention comprises a fibrous base coated with a coating material consisting of a solution of esters of polysaccharides in a volatile solvent in admixture with a blown oil specially prepared by blowing air into the heated camelia oil, such as tsubaki oil, sasanqua oil, or tea seed oil.

The blown oils are usually prepared by blowing air into the heated drying or semi-drying oils, such as linseed oil, perilla oil, cotton seed oil, soya bean oil, rape seed oil, etc. Such blown oils are extensively used in admixture with mineral oils for lubricating purposes. The blown oils thus prepared from drying or semi-drying oils have some drying power and consequently the stencil sheets coated with a composition including a cellulose ester in admixture with such a blown oil have certain drawbacks of drying and becoming brittle. Furthermore, it becomes sometimes rancid. These drawbacks are ascribed to the presence of the remarkable amounts of glyceride of linolic or linolenic acid.

According to the present invention, the blown oils are prepared by heating camelia oil, such as tsubaki oil or other similar oils such as sasanqua oil or tea seed oil, in a current of air to a somewhat elevated temperature. If necessary, a small amount of semi-drying oils or other non-drying oils may be added to the above oils. Tsubaki oil is obtained from the seeds of Thea japonica, Nois (Camellia japonica, L), a tree grown in Japan. Sasanqua oil is obtained from the seeds of Thea sasanqua, Nois (Camellia sasanqua, Thun), a tree very similar to the tsubaki tree. Tea seed oil is expressed on a large scale in China from the seeds of Thea sasanqua, Nois (Thunb.).

In contradistinction to castor oil, the blown oils obtained especially from camelia oil, such as tsubaki oil, sasanqua oil, and tea seed oil, have a higher degree of viscosity and no drying property and do not become rancid. Moreover, the blown oils obtained from camelia oil are also to be distinguished from fatty acid of tsubaki oil, or fatty acid of sasanqua oil in its chemical properties and the effect of the same used as an ingredient of the coating composition of stencil sheets. The blown oils obtained from camelia oils according to this invention are more easily miscible with the esters of polysaccharides, producing after the evaporation of the solvents a durable coating, which is not only soft and pliable but offers a considerably greater resistance and is not affected by changes in temperature, and it has no drawbacks of becoming brittle or rancid. These advantages are due to the presence of none of linolic or linolenic acid glyceride in the blown oils obtained especially from camelia oils. Thus, in so far as it is used as an ingredient of coating composition of stencil sheets, the blown oil obtained especially from camelia oils is to be materially differentiated from castor oil as well as from fatty acid of sasanqua oil or fatty acid of tsubaki oil.

In carrying out the invention, a sheet of fibrous base, such as Japanese Yoshino paper, is coated or impregnated with a coating material prepared by dissolving esters of polysaccharides, such as starch acetate, mannan acetate, cellulose acetate and cellulose nitrate, in a suitable solvent, such as acetone, alcohol, butyl alcohol, ethyl acetate, amyl acetate, benzine, benzol and toluol or a mixture of them, and then adding thereto the blown oils prepared from tsubaki oil or other similar oils stated above. If desired, a suitable amount of a tempering agent, such as naphthenic acid glyceride, hydrocarbon oils, fatty oils, fats, fatty acids, waxes, butyl tartrate, ethyl or butyl phthalate, and phenyl or cresyl phosphate, or a mixture of them, may be added to the above mixture.

The proportions of the ingredients of the composition may vary according to several circumstances. The following is

|  | Parts by weight |
|---|---|
| Cellulose nitrate | 10 |
| Amyl acetate | 20 |
| Butyl alcohol | 10 |
| Ethyl acetate | 30 |
| Alcohol | 30 |
| Benzol | 25 |
| Toluol | 25 |
| Blown tsubaki oil | 10 |
| Blown tea seed oil | 10 |
| Naphthenic acid glyceride | 5 |
| Oleine | 5 |
| Stearine | 2 |
| Paraffine oil | 3 |

The term "esters of polysaccharides" is intended to indicate not only one of definite esters, but also a mixture of them.

What I claim is:—

1. A stencil sheet adapted for stencilizing by pressure, consisting of a base of fibrous material having a coating comprising esters of polysaccharides and blown camelia oil.

2. A stencil sheet adapted for stencilizing by pressure, consisting of a base of fibrous material having a coating comprising esters of polysaccharides and blown tsubaki oil.

3. A stencil sheet adapted for stencilizing by pressure, consisting of a base of fibrous material having a coating comprising esters of polysaccharides and blown sasanqua oil.

4. A stencil sheet adapted for stencilizing by pressure, consisting of a base of fibrous material having a coating comprising esters of polysaccharides and blown tea seed oil.

5. A stencil sheet adapted for stencilizing by pressure, consisting of a base of fibrous material having a coating comprising esters of polysaccharides and blown tsubaki oil, and tempering agents.

6. A stencil sheet adapted for stencilizing by pressure, consisting of a base of fibrous material having a coating comprising esters of polysaccharides and blown sasanqua oil, and tempering agents.

7. A stencil sheet adapted for stencilizing by pressure, consisting of a base of fibrous material having a coating comprising esters of polysaccharides and blown tea seed oil, and tempering agents.

8. A stencil sheet adapted for stencilizing by pressure, consisting of a base of fibrous material having a coating comprising esters of polysaccharides, blown oil prepared from a mixture of tsubaki oil and other camelia oil or oils, and tempering agents.

9. A stencil sheet adapted for stencilizing by pressure, consisting of a base of fibrous material having a coating comprising esters of polysaccharides, blown camelia oil, and tempering agents.

SHINJIRO HORII.